(12) United States Patent
Guo et al.

(10) Patent No.: US 12,264,705 B2
(45) Date of Patent: Apr. 1, 2025

(54) RECIRCULATING ROLLER BEARING

(71) Applicants: KIS Bearing Technology (Asia Pacific) Co., Ltd., Shanghai (CN); THB BEARINGS CO., LTD., Shanghai (CN)

(72) Inventors: Hongjun Guo, Shanghai (CN); Lei Yuan, Shanghai (CN); Jianluo Mei, Shanghai (CN); Kai Cheng, Shanghai (CN); Ci Song, Shanghai (CN); Yuanzhen Wu, Shanghai (CN)

(73) Assignees: KIS Bearing Technology (Asia Pacific) Co., Ltd., Shanghai (CN); THB BEARINGS CO., LTD., Shanghai (CN)

( * ) Notice: Subject to any disclaimer, the term of this patent is extended or adjusted under 35 U.S.C. 154(b) by 190 days.

(21) Appl. No.: 18/129,915

(22) Filed: Apr. 3, 2023

(65) Prior Publication Data
US 2024/0167505 A1 May 23, 2024

(30) Foreign Application Priority Data

Nov. 23, 2022 (CN) .......................... 202211478002.2

(51) Int. Cl.
F16C 29/06 (2006.01)
F16C 29/00 (2006.01)

(52) U.S. Cl.
CPC ........ F16C 29/0602 (2013.01); F16C 29/004 (2013.01); F16C 29/0604 (2013.01);
(Continued)

(58) Field of Classification Search
CPC .............. F16C 29/0614; F16C 29/0616; F16C 29/0619
See application file for complete search history.

(56) References Cited

U.S. PATENT DOCUMENTS 3,752,543 A 8/1973 Schmidt
3,845,993 A * 11/1974 Schiler ................ F16C 29/0616
384/45

(Continued)

FOREIGN PATENT DOCUMENTS

JP 2010159871 A 7/2010

OTHER PUBLICATIONS

European Search Report of Corresponding Application EP 23165870. 9, mailed Sep. 19, 2023, 5 pages.

*Primary Examiner* — Alan B Waits
(74) *Attorney, Agent, or Firm* — Cooper Legal Group, LLC

(57) ABSTRACT

The present application relates to a field of bearing technology and relates to a recirculating roller bearing, including a front cover plate, a rear cover plate, an inner supporter, a sealing covering and a plurality of rolling carriers and at least one connector, in which the front cover plate and the rear cover plate are detachable connected on two sides of the inner supporter respectively; a circulating guiding path is defined by the front cover plate, the rear cover plate, the inner supporter and the sealing covering, the circulating guiding path includes a sealing portion and an opened load-bearing portion; the rolling carriers are filled in the circulating guiding path, each of the rolling carriers forms a rolling fit with the inner supporter, and each of the rolling carrier forms a rolling fit with a retractable fork when passing the opened load-bearing portion of the circulating guiding path.

18 Claims, 10 Drawing Sheets

(52) U.S. Cl.
    CPC ...... *F16C 29/0607* (2013.01); *F16C 29/0619* (2013.01); *F16C 2326/00* (2013.01)

(56) References Cited

U.S. PATENT DOCUMENTS

| | | | |
|---|---|---|---|
| 4,375,247 A | | 3/1983 | McNeely |
| 4,432,587 A | * | 2/1984 | Bryan ................. F16C 29/0616 384/45 |
| 4,496,195 A | * | 1/1985 | Kwon ................. F16C 29/0619 384/44 |
| 4,544,211 A | * | 10/1985 | Kwon ................. F16C 29/0619 384/44 |
| 4,557,530 A | * | 12/1985 | Haase ................. F16C 29/0623 384/45 |
| 2015/0176643 A1 | | 6/2015 | Hoshide et al. |

\* cited by examiner

RECIRCULATING ROLLER BEARING

CROSS-REFERENCE TO RELATED APPLICATION

This application claims the priority and benefit of Chinese patent application serial no. 202211478002.2, filed on Nov. 23, 2022. The entirety of Chinese patent application serial no. 202211478002.2 is hereby incorporated by reference herein and made a part of this specification.

TECHNICAL FIELD

The present application relates to a field of bearing technology and in particular, relates to a recirculating roller bearing.

BACKGROUND ART

With the popularization of automated warehouses, the use of high rack warehouse in the warehousing and logistics industry has greatly increased the space utilization. In addition, the warehouse logistics handling robot system adapted to the warehouse is attracting more and more attention. The stacker is one of the important tools in the warehouse logistics robot transport system. The retractable fork is one of the components of the stacker, while the roller bearing for supporting the retractable fork is the most important component, which is configured to sustain the retractable fork and improve motion smoothness of the retractable fork.

In the related technology, a load-bearing structure as shown in FIG. 11 is a roller bearing for supporting generally used in the retractable fork 70 in the market. The load-bearing structure includes a bearing inner ring 10, a bearing outer ring 20 for supporting, and a roller 30 disposed between the bearing inner ring 10 and the bearing outer ring 20. The installation structure of the load-bearing structure shown in FIGS. 12 and 15 includes a main frame body 40 fixedly installed in the stacker or devices with retractable fork 70, a bolt connector 50 successively extends through the roller bearing and the main frame body 40, and a connection nut 60 threadedly connected to the bolt connector 50. They are so arranged, that two or three roller bearings are arranged along the retraction direction of the retractable fork 70, and the distance between the outer surfaces of adjacent bearings is 1-2 mm. The bearing outer ring of the roller bearing services directly as a supporting wheel. The roller bearing may subject to impact load from the retractable fork 70 when in use. Therefore, the wall thickness of the outer ring of a roller bearing is increased by more than 50% compared with a traditional solid needle bearing or cylindrical roller bearing, in order to improve the anti-impact capacity of the roller bearing, which results in a lower rated dynamic load, a lower load capacity and a shorter service life of the roller in the roller bearing.

The requirements on load capacity and transport speed of the retractable fork are becoming more stringent, while the volume of the retractable fork tends to be lightweight. Therefore, the structure and the occupied volume of the retractable fork haven't been greatly changed, i.e., the installation space of the roller bearing cannot be increased any more under the requirement of lightweight, that is, the service life of the roller bearing cannot be extended by increasing the volume of the roller of the roller bearing. The service life of the roller bearing is required to be longer under the industrial requirements of reducing costs and increasing profitability. The traditional roller bearings cannot meet the developing requirements of the retractable fork, which is urgent to be improved.

SUMMARY

A recirculating roller bearing is provided, in order to increase load capacity and service life of the bearing in a limited installation space.

The recirculating roller bearing provided adopts the following technical solution.

A recirculating roller bearing, comprising a front cover plate, a rear cover plate, an inner supporter, a sealing covering, a plurality of rolling carriers and at least one connector, wherein:

the front cover plate and the rear cover plate are detachable connected to two opposite sides of the inner supporter respectively, the sealing covering is arranged around the inner supporter and is arranged between the front cover plate and the rear cover plate in a sealing manner;

a circulating guiding path is formed between the front cover plate, the rear cover plate, the inner supporter and the sealing covering, the circulating guiding path comprises a sealing portion and an opened load-bearing portion;

the plurality of rolling carriers are all filled in the circulating guiding path, each of the plurality of rolling carriers is in rolling fit the inner supporter, and each of the plurality of rolling carriers is in rolling fit with a retractable fork when passing the opened load-bearing portion of the circulating guiding path;

the connector is configured to detachably fix the inner supporter, the front cover plate and the rear cover plate on a main frame body.

With the above technical solution, the front cover plate is firstly mounted on the inner supporter. The front cover plate is then laid flat on a plane. A circulating guiding path that opened upwards on a single side is formed between the front cover plate and the inner supporter. At this time, the plurality of rolling carriers are arranged in the circulating guiding path that opened upwards on a single side. Then the rear cover plate is mounted on a side of the inner supporter away from the front cover plate, so as to limit the rolling carriers from two opposite sides. Afterwards the sealing covering is arranged around the inner supporter and mounted between the front cover plate and the rear cover plate in a sealing manner, thereby forming the circulating guiding path. The rolling carriers are filled in the circulating guiding path. Finally, the inner supporter, the front cover plate and the rear cover plate are mounted on the main frame body by the connector. When in use, the rolling carriers passing the opened load-bearing portion are in an exposed state by using the opened load-bearing portion of the circulating guiding path, so as to form a rolling fit with the retractable fork.

Compared with the traditional needle roller bearings with sealing element, the outer ring structure servicing as a rolling wheel is removed. The rolling carrier is directly used to bear load. Therefore, the diameter Dw of the rolling carrier in the present application is certainly larger than the needle diameter Dw of the traditional needle roller bearing with sealing element and may be more than twice larger. According to the rated dynamic load formula of a radial roller bearing: $C_r = b_m f_c (iL_{we} \cos \alpha)^{7/9} Z^{3/4} DW^{29/27}$, the rated dynamic load of the present application is larger than the rated dynamic load of the traditional needle roller bearing with sealing element and may be more than one time larger. According to the basic rated service life formula of a radial roller bearing:

$$L_{10} = \left(\frac{C_r}{p_r}\right)^{10/3},$$

the rated fatigue me or the present application is longer than that of the traditional needle roller bearing with sealing element with same dimension and may be more than 10 times longer, greatly extending maintenance cycle and reducing maintenance cost. The load capacity and service life are increased not by singly increasing the dimension of the original structure. The whole dimension isn't increased compared with the roller bearing with outer ring, thereby being applicable to the current development of lightweight.

In addition, a plurality of rolling carriers are adopted in the present application to equally bear external load. Therefore, the contact strain of the portion of the retractable fork and stacker corresponding to the main frame body is less than 50% of the original contact strain. Therefore, the service life of the portion of the retractable fork and stacker corresponding to the main frame body is extended more than 8 times. Further, the equipment such as the retractable fork and stacker in the present application has a smaller dimension under the same load-bearing condition, so that the equipment such as the retractable fork and stacker is smaller and compacter, satisfying the development of lightweight.

Preferably, the connector successively extends through the front cover plate, the inner supporter and the rear cover plate, an extension end of the connector is provided with a connection portion, the connection portion is configured to be detachably connected to the main frame body, and an end of the connector away from the extension end is in limiting and abutment fit with the inner supporter.

With the above technical solution, the connecter successively extends through the front cover plate, the inner supporter and the rear cover plate, and the limiting and abutment fit is formed between the connector and the front cover plate, so that the whole structure is easy to mount on the main frame body and this mounting manner can further increase the installation tightness between the front cover plate and the inner supporter.

Preferably, the front cover plate is provided with a first through hole, the inner supporter and the rear cover plate are provided with a second through hole respectively, a diameter of the first through hole is larger than a diameter of the second through hole. The end of the connector away from the extension end is provided with a limiting protrusion, the limiting protrusion is configured to be embedded in the first through hole, and the limiting protrusion abuts against a side of the inner supporter close to the front cover plate.

With the above technical solution, the first through hole of the front cover plate and the second through hole of the inner supporter form a countersunk hole, so as to hide the limiting protrusion of the connector by the first through hole, thereby saving installation space. In addition, a limiting and abutment fit with the inner supporter is realized by the limiting protrusion, so as to realize installation tightness between the inner supporter and the front cover plate.

Preferably, the connection portion is configured as a fixing thread, which is configured to be engaged with a fastening nut, and two ends of the connector along an extension direction thereof are provided with a polygon countersunk groove respectively.

With the above technical solution, the connection portion is configured as the fixing thread, so as to realize assembly between the connector and the main frame body by combining with the fastening nut in actual installation. In addition, the connector can be detached in actual detachment by using the polygon countersunk groove inside the connector in combination with an inner spanner, thereby realizing a detachable assembly between the connector and the main frame body.

Preferably, the connector is provided with an oil through groove communicating with the polygon countersunk groove, and the inner supporter is provided with a communicating groove communicating with the circulating guiding path and the oil through groove.

With the above technical solution, lubricating grease is introduced in the oil through groove in actual use in order to improve smoothness of the rolling carriers circulating in the circulating guiding path. The lubricating grease will further enter the circulating guiding path through the oil through groove and the communicating groove, to lubricate the rolling carriers.

Preferably, a load-bearing point is defined at a contact position between a radially outmost portion of the plurality of rolling carriers at the opened load-bearing portion and the retractable fork, two ends of the sealing covering at the opened load-bearing portion are provided with a protruded portion protruding relative to the load-bearing point respectively, the protruded portion is elastic and is configured to abut against a contact surface of the retractable fork in a sealing manner.

With the above technical solution, the portion of the sealing covering at two ends of the opened load-bearing portion is higher than the load-bearing point of the rolling carrier. The abutment and sealing between the sealing covering and the retractable fork is realized by using the elasticity of the sealing covering itself. In one aspect, external dust and moisture are avoided to enter the circulating guiding path. In another aspect, the portion plays a role of scraper, preventing the lubricating grease from moving with the retractable fork and in turn from being brought out of the circulating guiding path, thereby ensuring the lubrication efficiency of the rolling carrier.

Preferably, the plurality of rolling carriers are configured as cylinder rollers, two ends of each of the cylinder rollers are provided with a guiding protrusion respectively, opposite sides of the front cover plate and the rear cover plate facing to each other are provide with a circulating guiding groove in a same circulating direction as the circulating guiding path respectively, a circumferential surface of each of the cylinder rollers is in rolling fit with the inner supporter, and the guiding protrusion is configured to be embedded in the circulating guiding groove.

With the above technical solution, the load-bearing area is greatly increased by using the cylinder rollers. The motion stability of the cylinder rollers in the circulating guiding path is greatly improved by the embedded fit between the guiding protrusion and the circulating guiding groove.

Preferably, there are at least two connectors, and the at least two connectors are arranged at intervals along the retraction direction of the retractable fork.

With the above technical solution, there are at least two connectors, so as to increase installation stability of the front cover plate, the inner supporter, and the rear cover plate on the main frame body.

Preferably, there is one connector, which is shaped as a cylinder.

With the above technical solution, there is one connector, while the connector is shaped as a cylinder, so that the front cover plate, the inner supporter and the rear cover plate that are fixedly connected to each other as a whole can rotate relative to the connector, thereby facilitating adjusting the angle between the opened load-bearing portion and the contact surface of the retractable fork, ensuring the fit between the opened load-bearing portion and the retractable fork.

Preferably, a segment of the circulating guiding path at the opened load-bearing portion extends linearly, and the opened load-bearing portion extending linearly is parallel to the retraction direction of the retractable fork.

With the above technical solution, the segment of the circulating guiding path at the opened load-bearing portion extends linearly and the opened load-bearing portion extending linearly is parallel to the retraction direction of the retractable fork, greatly increasing the load-bearing area of the retractable fork by the load-bearing structure, and in turn increasing anti-load capacity and service life of the whole structure.

In summary, at least one of the following beneficial effects are realized:

1. The diameter of the rolling carrier in the present application is larger than the needle diameter of the traditional needle roller bearing. The rated fatigue life is increased to be more than 10 times longer than that of the traditional sealing needle roller bearing with same dimension, greatly extending the maintenance cycle and reducing the maintenance cost.
2. No additional components for adjusting the straightness between two bearing bodies is required when using the recirculating roller bearing in the present application, thereby reducing cost and facilitating the installation and adjustment of the whole structure, so as to realize uniform force of the bearing and to increase the service life.
3. A plurality of rolling carriers are adopted in the present application to equally bear external load, which greatly reduces the contact strain and has a smaller dimension, thereby satisfying the current development of lightweight.
4. The sealing covering has a limiting effect on the rolling carriers. The elastic protruded portions at two ends of the opened load-bearing portion realize abutment and sealing against the retractable fork, preventing external dust and moisture from entering the circulating guiding path and avoiding the lubricating grease in the circulating guiding path from leaking out of the circulating guiding path, so as to reduce using amount of the lubricating grease and improve utilization rate of the lubricating grease.
5. The present application increases the bearing capacity and the service life, greatly reduces the dimension of the whole structure, and reduces the material cost and the weight of the whole structure.
6. The lubricating grease not only plays a role of lubrication, but also plays a role of reducing noise, so as to realize a smooth operation without noise.
7. The inner supporter improves rigidity and economy of the whole structure, and in turn prolongs the service life of the whole bearing system by increasing rigidity.

DETAILED DESCRIPTION

The present application is further described in detail below in combination with FIGS. 1-12.

The embodiments of the present application disclose a recirculating roller bearing.

Embodiment One

Figure 1:
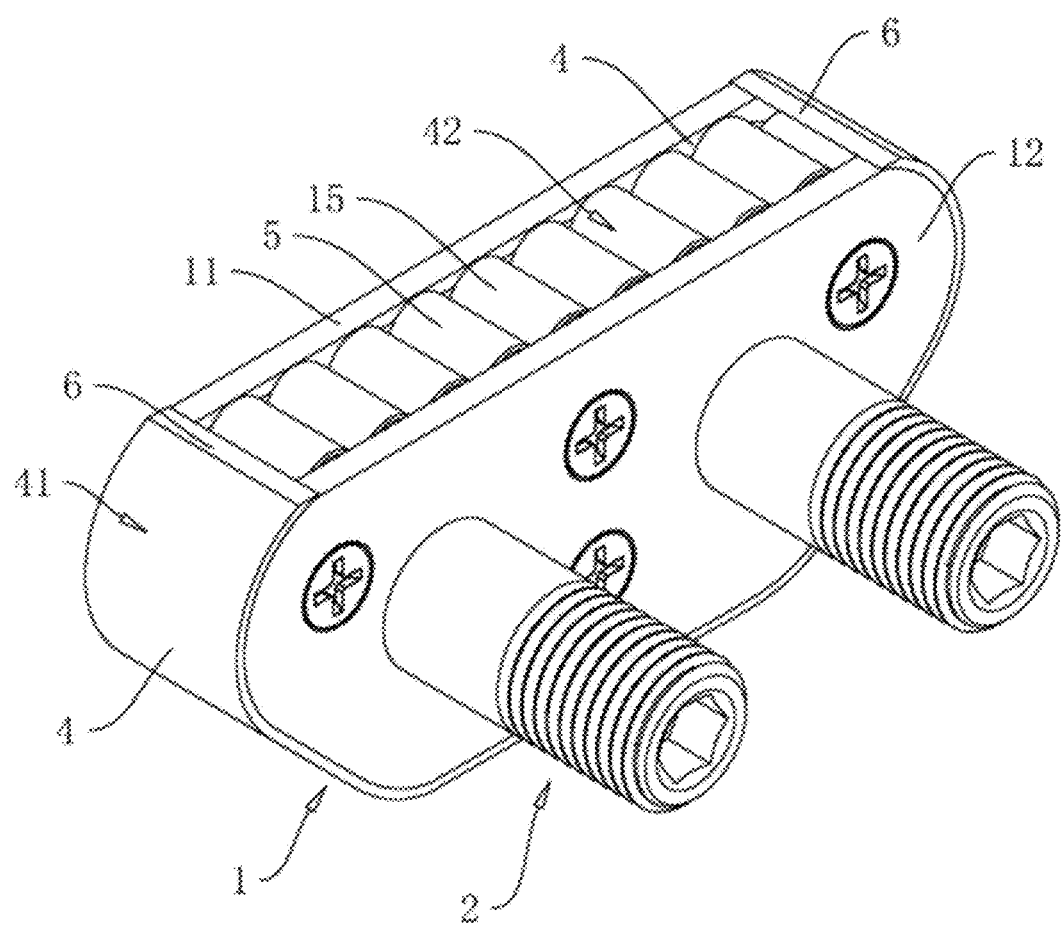
FIG. 1 is an axonometric schematic diagram mainly for indicating a whole structure of a recirculating roller bearing in Embodiment one of the present application.
Figure 2:
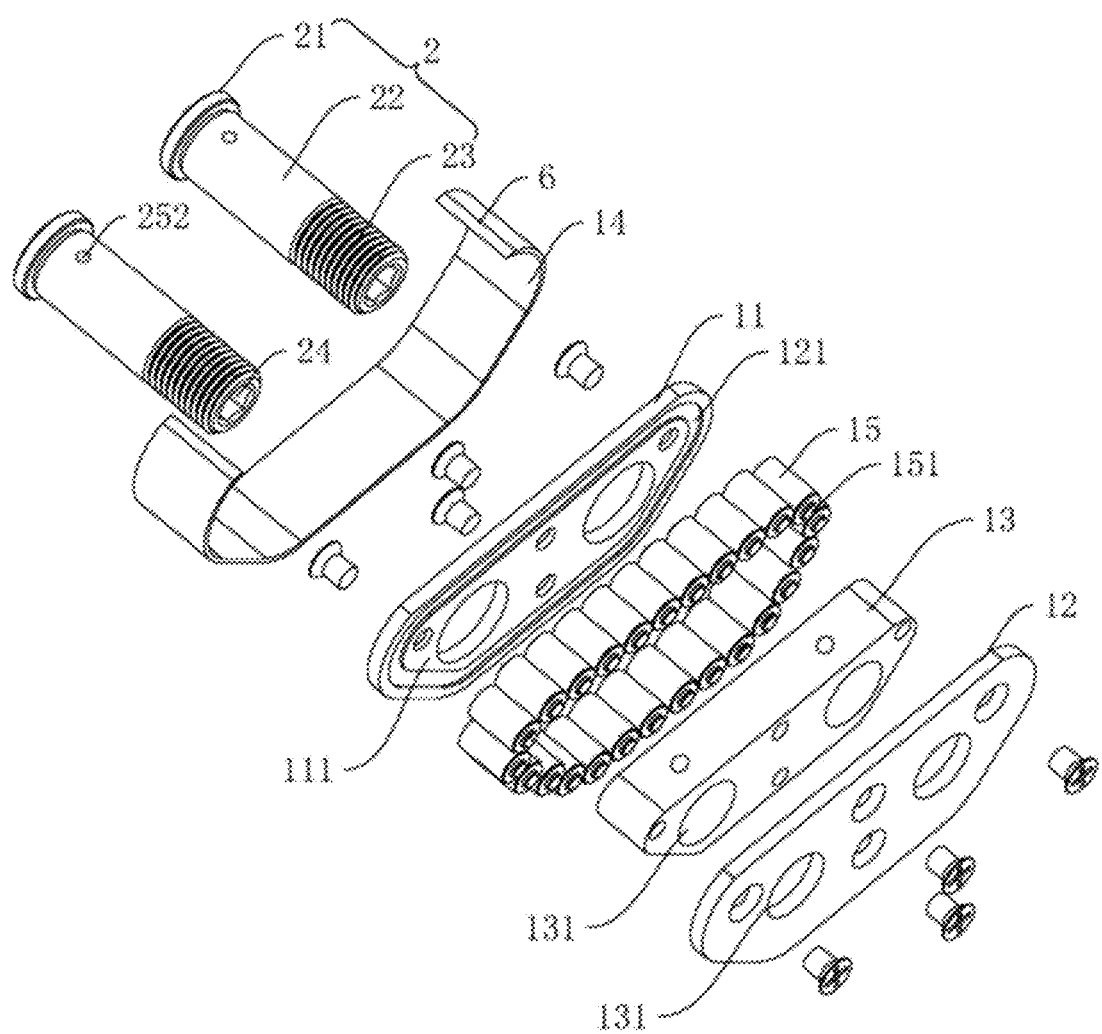
FIG. 2 is an explosion diagram mainly for indicating a structure of the recirculating roller bearing in Embodiment one of the present application.

Referring to FIG. 1 and FIG. 2, the recirculating roller bearing includes a bearing body 1 and a connector 2, in which the connector 2 is detachably connected to the bearing body 1, and the connector 2 is detachably fixedly connected with a main frame body of a stacker or other machines and devices equipped with a retractable fork structure. The main frame body is fixedly arranged in a frame structure of a stacker or other machines and devices. The bearing body 1 is detachably fixed on the main frame body of a stacker or other machines and devices equipped with a retractable fork structure by the connector 2.

Figure 3:
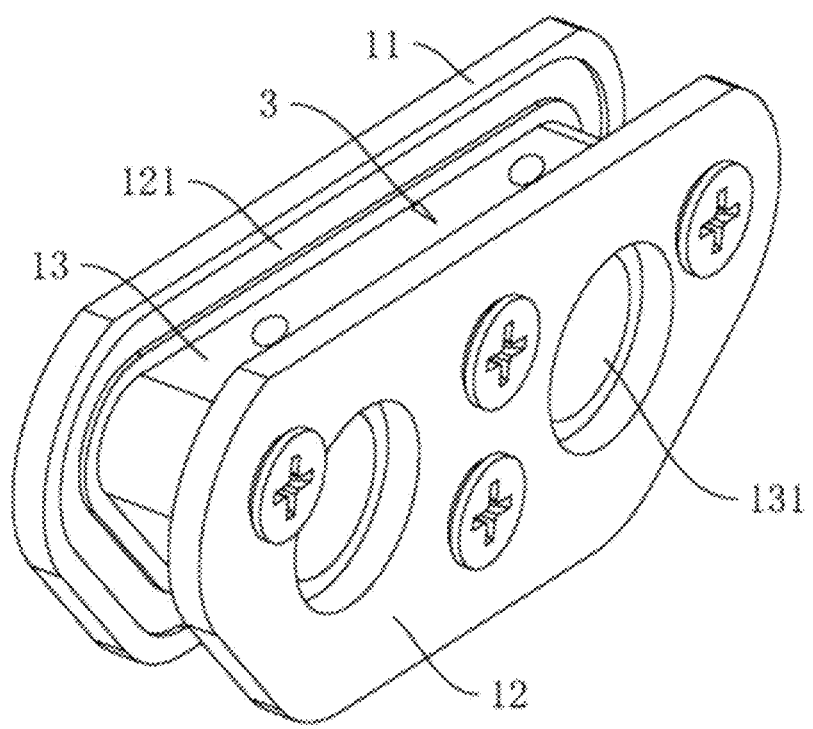
FIG. 3 is a structural schematic diagram mainly for indicating an accommodation space defined by a front cover plate, an inner supporter and a rear cover plate in Embodiment one of the present application.

Referring to FIG. 2 and FIG. 3, the bearing body 1 includes a front cover plate 11, a rear cover plate 12, an inner supporter 13 and a sealing covering 14. The front cover plate 11 and the rear cover plate 12 are detachably connected to two opposite sides, namely two sides in a thickness direction, of the inner supporter 13 by fastening bolts respectively. The section areas of the front cover plate 11 and the rear cover plate 12 are identical and both larger than the lateral area of the inner supporter 13 in the thickness direction. An accommodation space 3 for accommodating rolling carriers 15 is formed between two side faces of the front cover plate 11 and the rear cover plate 12 facing to each other and the periphery of the inner supporter 13.

Figure 4:
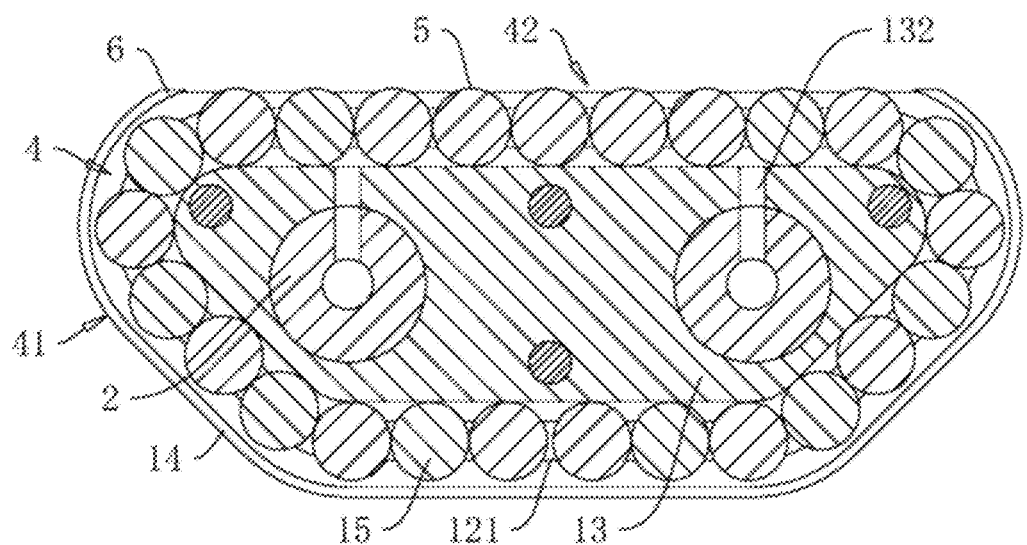
FIG. 4 is a section diagram mainly for indicating the structure of the recirculating roller bearing in Embodiment one of the present application.

Referring to FIG. 3 and FIG. 4, the sealing covering 14 is made of metal or rubber. The sealing covering 14 is arranged around the inner supporter 13 along the peripheries of the front cover plate 11 and the rear cover plate 12. Two lateral edges of the sealing covering 14 are arranged between the peripheries of the front cover plate 11 and the rear cover plate 12 in a sealing manner by sealant. That is, the sealing covering 14 is arranged around the accommodation space 3, such that a circulating guiding path 4 is formed between the accommodation space 3 defined by the front cover plate 11, the rear cover plate and the inner supporter 13 and the sealing covering 14. The circulating guiding path 4 includes a sealing portion 41 and an opened load-bearing portion 42.

Referring to FIG. 2 and FIG. 4, the bearing body 1 further includes a plurality of rolling carriers 15, which are filled in the circulating guiding path 4. In the embodiment of the present application, each rolling carrier 15 is configured as a cylinder roller. Two ends of each rolling carrier 15 in the axial direction are both integrally formed with a guiding protrusion 151. Correspondingly, sides of the front cover plate 11 and the rear cover plate 12 facing to each other are provided with a circulating guiding groove 121 in a same circulating direction as the circulating guiding path 4 respectively. A rolling fit is formed between the circumferential surface of any cylinder roller and the sidewall of the inner supporter 13 perpendicular to the thickness direction thereof. The guiding protrusions 151 on two ends of each cylinder roller in the axial direction are respectively embedded in the circulating guiding grooves 121 of the front cover plate 11 and the rear cover plate 12, so as to ensure motion stability of the cylinder roller in the circulating guiding path 4.

Referring to FIG. 1 and FIG. 4, the front cover plate 11, the inner supporter 13, the rear cover plate 12 and the circulating guiding path 4 are all shaped in a trapezoid shape in the embodiment of the present application. The opened load-bearing portion 42 corresponding to the lower bottom of the trapezoid is parallel to the retraction direction of the retractable fork, that is, the opened load-bearing portion 42 is extends linearly, greatly increasing the load-bearing area. When the rolling carriers 15 are positioned at the opened load-bearing portion 42 of the circulating guiding path 4, a rolling fit is formed between the rolling carriers and the retractable fork, playing a role of supporting the retractable fork simultaneously.

That is to say, the rolling carrier 15 directly services as bearing component, which is configured to abut against the retractable fork. Compared with the needle roller bearings generally used in the existing technology, the outer ring structure servicing as a rolling wheel is removed. Therefore, the diameter Dw of the rolling carrier 15 in the embodiment of the present application is larger than the needle diameter Dw of the traditional needle roller bearing and may be more than twice larger. According to the rated dynamic load formula of a radial roller bearing: $C_r = b_m f_c (i L_{we} \cos \alpha)^{7/9} Z^{3/4} DW^{29/27}$, the rated dynamic load of the present application is increased to be more than one time larger than the rated dynamic load of the traditional sealing needle roller bearing. According to the basic rated service life formula of a radial roller bearing:

$$L_{10} = \left(\frac{C_r}{p_r}\right)^{10/3},$$

the rated fatigue life of the present application is increased to be more than 10 times longer than that of the traditional sealing needle roller bearing with same dimension, greatly extending the maintenance cycle and reducing the maintenance cost.

In addition, a plurality of rolling carriers 15 are adopted in the present application to equally bear external load. The contact strain of the retractable fork and the main frame body is less than 50% of the original contact strain. Therefore, the service life of the retractable fork and the main frame body is extended more than 8 times. Further, the retractable fork and stacker in the present application has a smaller dimension under the same load, so that the retractable fork and stacker is smaller and compacter, satisfying the development of lightweight.

Referring to FIG. 2 and FIG. 4, the connector 2 is configured to be a connection bolt, which is shaped as a cylinder. The connection bolt includes a limiting protrusion 21, a rod portion 22 and a connection portion 23, the connection portion is configured to be detachably connected to the main frame body. The front cover plate 11 is provided with two first through holes 111, which are spaced with each other along the retraction direction of the retractable fork 8. Similarly, the inner supporter 13 and the rear cover plate 12 are provided with two second through holes 131 respectively, which are spaced with each other along the retraction direction of the retractable fork 8. The two first through holes 111 are respectively corresponding to the two second through holes 131. The first through hole 111 is coaxial with the corresponding second through hole 131. The axis of any first through hole 111 and second through hole 131 is perpendicular to the retraction direction of the retractable fork 8. There are two connection bolts. Since the structures and the connection manners to the bearing body 1 of the connection bolts are the same, the connection manner between one of the connection bolts and the bearing body 1 is exemplarily explained.

Referring to FIG. 2 and FIG. 4, the connection bolt successively extends through the first through hole 111 of the front cover plate 11, the second through holes 131 of the inner supporter 13 and the rear cover plate 12 with its connection portion 23. The limiting protrusion 21 of the connection bolt is embedded in the first through hole 111 of the front cover plate 11, that is, the first through hole 111 and the second through hole 131 from a countersunk hole here, so that the limiting protrusion 21 of the connection bolt can not only limit the front cover plate 11, but also abut against the inner supporter 13, which is beneficial to fixation of the front cover plate 11 with the inner supporter 13. The inner supporter 13 and the rear cover plate 12 are both positioned at the rod portion 22 of the connection bolt.

Referring to FIG. 2, the connection portion 23 of the connection bolt is configured as a fixing thread. Both ends of the connection bolt in the axial direction are provided with a polygon countersunk groove 24 respectively. In the embodiment of the present application, the polygon countersunk groove 24 is a hexagon countersunk groove. The thread connection between the fastening bolt and the fastening nut can be realized on two ends of the connection bolt in axial direction by an inner hexagon spanner.

Referring to FIG. 2 and FIG. 4, an oil through groove 25 communicating with the polygon countersunk groove 24 is provided in the connection bolt. The oil through groove 25 includes a first oil groove 251 parallel to the connection bolt in axial direction and a second oil groove 252 perpendicular to the first oil groove 251. A communicating groove 132 is provided in the inner supporter 13 corresponding to another open end of the second oil groove 252. The communicating groove 132 is communicated with the circulating guiding path 4, and the communicating portion of the communicating groove 132 extends vertically upwards.

In practice, the operator introduces lubricating grease into the oil through groove 25 by an oiling device. The grease will enter the second oil groove 252 from the first oil groove 251, and further enter the circulating guiding path 4 to lubricate the rolling carriers 15.

In other embodiments, the distance between two connection bolts can be adjusted according to the service conditions, so as to meet different use requirements.

Referring to FIG. 4, a load-bearing point 5 is defined at a contact position between the radially outmost portion of the rolling carrier 15 at the opened load-bearing portion 42 and the retractable fork. Each of the two ends of the sealing covering 14 at the opened load-bearing portion 42 is provided with a protruded portion 6 protruding relative to the load-bearing point 5, in order to prevent the lubricating grease from leaking out of the opened load-bearing portion 42. The protruded portion 6 is configured to be elastic and abuts against a contact surface of the retractable fork in a sealing manner. The protruding height of the sealing covering 14 is set as 1 mm, to avoid resistance caused by friction and to achieve a better sealing contact effect.

The implementation principle of the embodiment in the present application is: the front cover plate 11 is fixedly connected with the inner supporter 13 by fastening screw in actual installation process. The front cover plate 11 is laid flat on a plane, so that the inner supporter 13 faces upwards. The corresponding number of rolling carriers 15 are placed in the accommodation space 3 between the front cover plate 11 and the inner supporter 13 one by one, meanwhile, the guiding protrusion 151 of each rolling carrier 15 is embedded in the circulating guiding groove 121 of the front cover plate 11.

Afterwards, the rear cover plate 12 is fixed on the side of the inner supporter 13 away from the front cover plate 11 by a fastening screw. The guiding protrusion 151 on the other end of the rolling carrier 15 is ensured to be embedded in the circulating guiding groove 121 of the rear cover plate 12 in the fixing process.

Then the sealing covering 14 are connected between the front cover plate 11 and the rear cover plate 12 in a sealing manner by a sealant along the peripheries of the front cover plate 11 and the rear cover plate 12, so as to form the opened load-bearing portion 42 and the sealing portion 41. The opened load-bearing portion 42 is ensured to be positioned on the lower bottom of the trapezoid of the front cover plate 11 and the rear cover plate 12 in the process of the connection in a sealing manner.

Finally, two connection bolts successively extend through the first through hole 111 and the second through holes 131 of the bearing body 1, and the fixing threads of the two connection bolts extend through the main frame body and are engaged with the fastening nut, so as to fasten the bearing body 1 on the main frame body.

Embodiment Two

Figure 5:
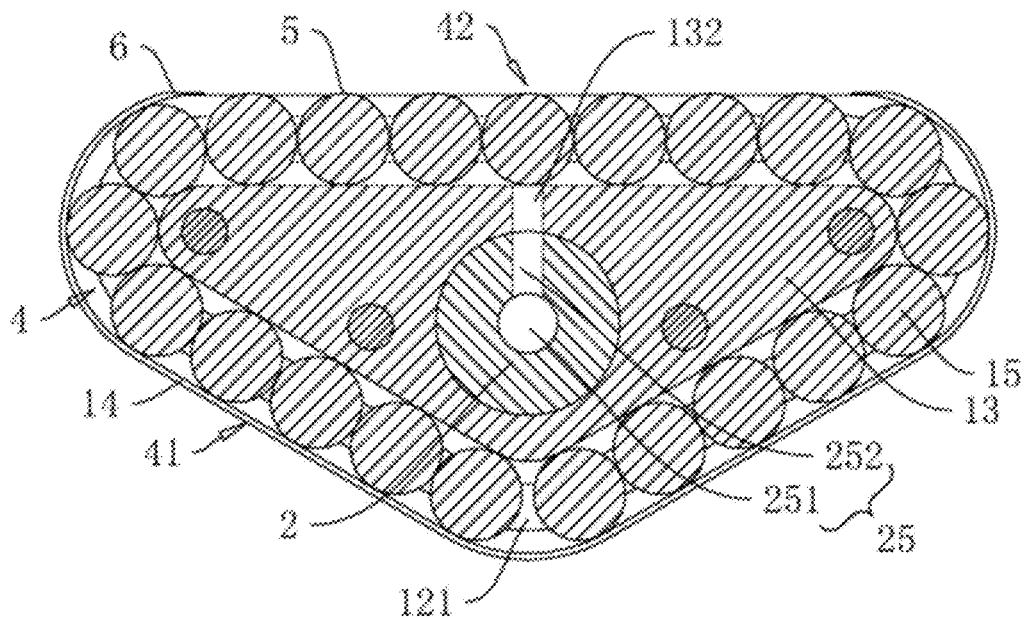
FIG. 5 is a section diagram mainly for indicating a structure of a recirculating roller bearing in Embodiment two of the present application.

Referring to FIG. 5, this embodiment differs from Embodiment two in that: there is one connector 2, that is, there is one connection bolt. In the embodiment of the present application, the bearing body 1 consisting of the front cover plate 11, the inner supporter 13, the rear cover plate 12 and the sealing covering 14 has an isosceles triangle shape. The opened load-bearing portion 42 of the bearing body 1 is positioned at the base of the bearing body 1.

The bearing body 1 may rotate relative to the connection bolt in the actual installation process. The operator can adjust the fit of the opened load-bearing portion 42 of the bearing body 1 relative to the contact surface of the retractable fork. Since the bearing body 1 has an isosceles triangle shape, the bearing body 1 is hard to collide with other structures during adjustment. Therefore, the operator can correspondingly install a plurality of recirculating roller bearings in the embodiment of the present application on the main frame body according to the service condition requirements, realizing collation of multiple combinations.

Embodiment Three

The lubricating grease is required to be added regularly in the technical solutions of the above embodiments. The normal operation of the recirculating roller bearing tends to be easily influenced when the operator doesn't add the lubricating grease for a long time. Therefore, referring to FIG. 6 and FIG. 7, a lubricating groove 133 is provided in an outer sidewall of the inner supporter 13 in the embodiment. A self-lubricating body 135 is placed in the lubricating groove 133. When the rolling carriers 15 pass by the lubricating groove 133, the self-lubricating body 135 in the lubricating groove 133 is scraped. The self-lubricating body 135 lubricates the bearing body 1 with the motion of the rolling carriers 15.

The lubricating groove 133 is arranged at the area corresponding to the sealing portion 41. Preferably, the lubricating groove 133 is located in the middle of the inclined surface of the inner supporter 13. For example, the lubricating groove 133 is arranged on two waists of the trapezoid when the inner supporter 13 has a trapezoid shape; the lubricating groove 133 is arranged on two sides corresponding to the non-load side when the inner supporter 13 has an isosceles triangle shape.

A mounting base 134 is disposed in the lubricating groove 133. The mounting base 134 is a plastic structure, which is interference fitted in the lubricating groove 133. The self-lubricating body 135 is mounted in the mounting base 134. The self-lubricating body 135 is a resin with lubricating oil, in which the lubricating oil is retained in gaps between resin particles. In this embodiment, the self-lubricating body 135 protrudes out of the lubricating groove 133 partly. The lower middle part of the self-lubricating body 135 is excavated, so that the self-lubricating body 135 has an elastic deformation in the mounting base 134 when sustaining pressure from the roller, ensuring the upper side of the self-lubricating body 135 to protrude out of the lubricating groove 133 and abut against the surface of the rolling carriers 15 all along. Meanwhile, two ends of the upper side of the self-lubricating body 135 are configured to be conical surfaces, so as to facilitate the rolling carriers 15 to scrape grease from the self-lubricating body 135.

Since each rolling carrier 15 scrapes a small amount of grease at one time, using the structure in this embodiment can ensure that the equipment is not required to be added with grease for life, that is, the bearing can be maintenance-free for life by using this structure.

Figure 6:
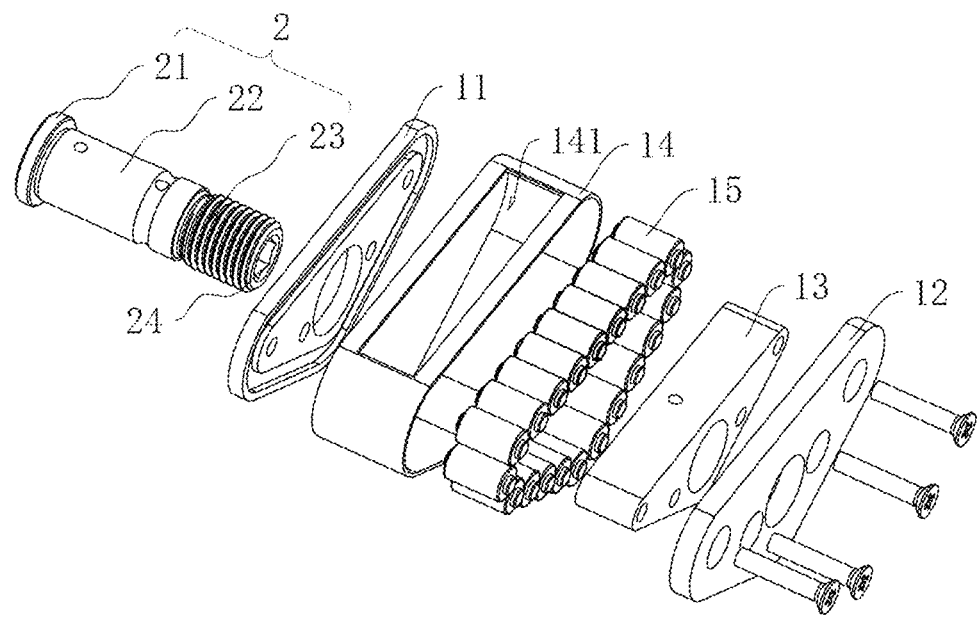
FIG. 6 is an explosion diagram mainly for indicating a structure of a recirculating roller bearing in Embodiment three of the present application.
Figure 7:
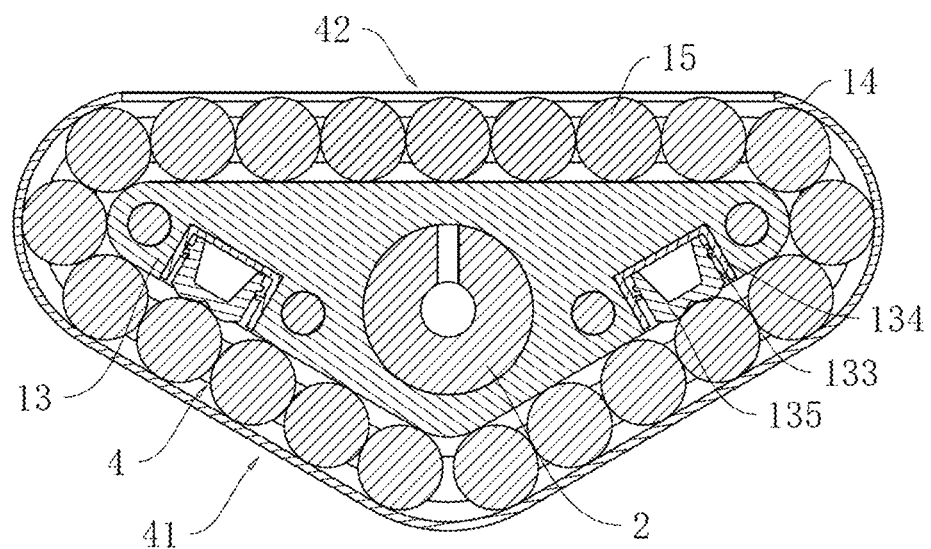
FIG. 7 is a section diagram mainly for indicating the structure of the recirculating roller bearing in Embodiment three of the present application.

The sealing covering 14 is configured to be an annular structure, in order to further improve sealing effect and reduce wastage of the lubricating grease. A load-bearing groove 141 is provided in an area of the sealing covering 14 corresponding to the opened load-bearing portion 42, and the load-bearing groove 141 extends through the sealing covering 14 only in a load-bearing direction. The sealing covering 14 can abut against the portions of the front cover plate 11 and the rear cover plate 12 corresponding to the opened load-bearing portion 42 in a sealing manner. Referring to FIG. 6, the load-bearing groove 141 vertically extends through the sealing covering 14, so that a portion of the sealing covering 14 abuts against the ends of the rolling carrier 15 at the load-bearing position, reducing leakage of the lubricating grease. In addition, the sealing covering 14 is easy to produce, thereby no bend and crimp etc. are necessary.

Embodiment Four

Figure 13:
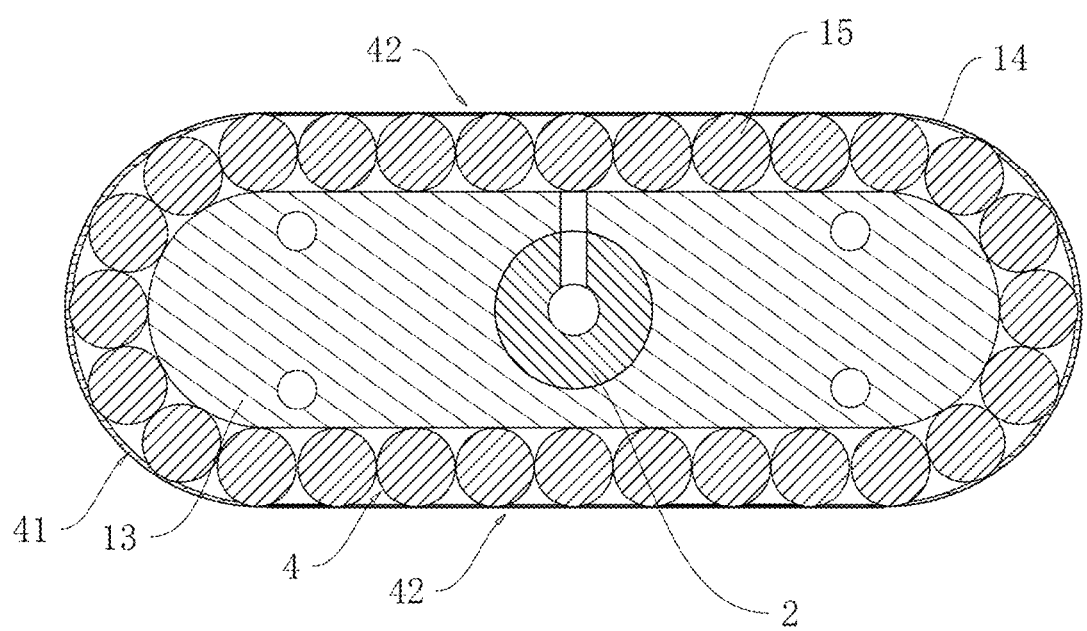
FIG. 13 is a section diagram mainly for indicating the structure of the recirculating roller bearing in Embodiment four of the present application.
Figure 14:
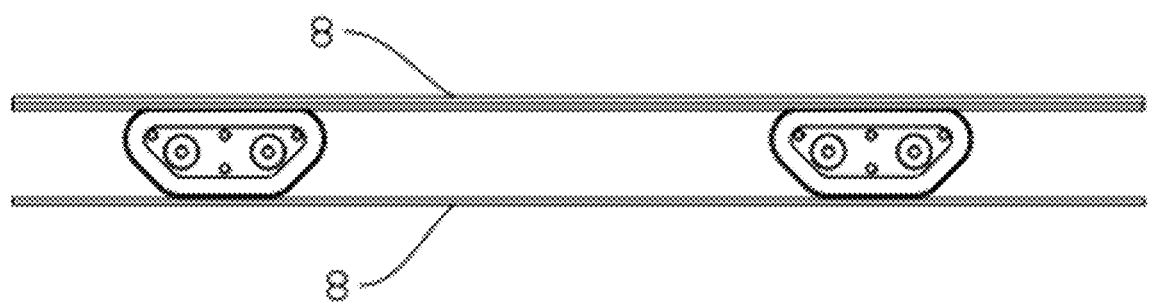
FIG. 14 is a schematic diagram mainly for indicating a connection method between the recirculating roller bearing and the retractable fork in Embodiment one of the present application.
Figure 15:
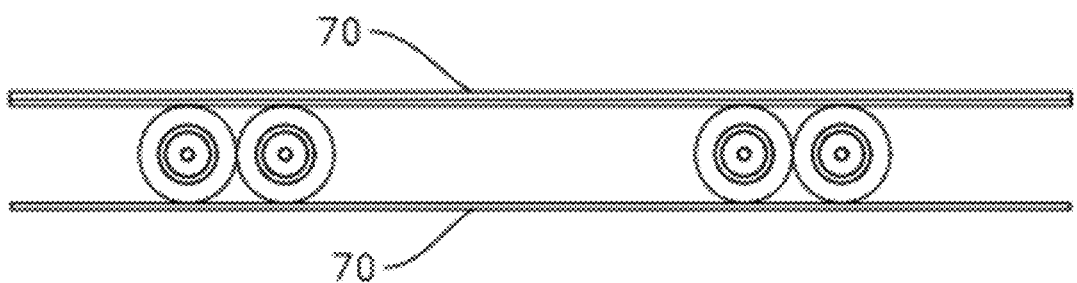
FIG. 15 is a schematic diagram mainly for indicating a connection method between the roller bearing and the retractable fork in the related technology.

Referring to FIG. 13, this embodiment differs from Embodiment one in that: there is one connector 2. Certainly, the number of the connector 2 can be two or more in other embodiments. In this embodiment of the present application, the bearing body 1 consisting of the front cover plate 11, the inner supporter 13, the rear cover plate 12 and the sealing covering 14 has a substantially ellipse shape, so that the circulating guiding path 4 includes an arc-shaped sealing portion 41 and two linear opened load-bearing portion 42. In this embodiment, there are two load-bearing grooves 141. The load-bearing groove 141 vertically extends through the sealing covering 14, so that a portion of the sealing covering 14 abuts against the ends of the rolling carrier 15 at the load-bearing position.

The embodiment of the present application further discloses a supporting structure for retractable fork.

Figure 8:
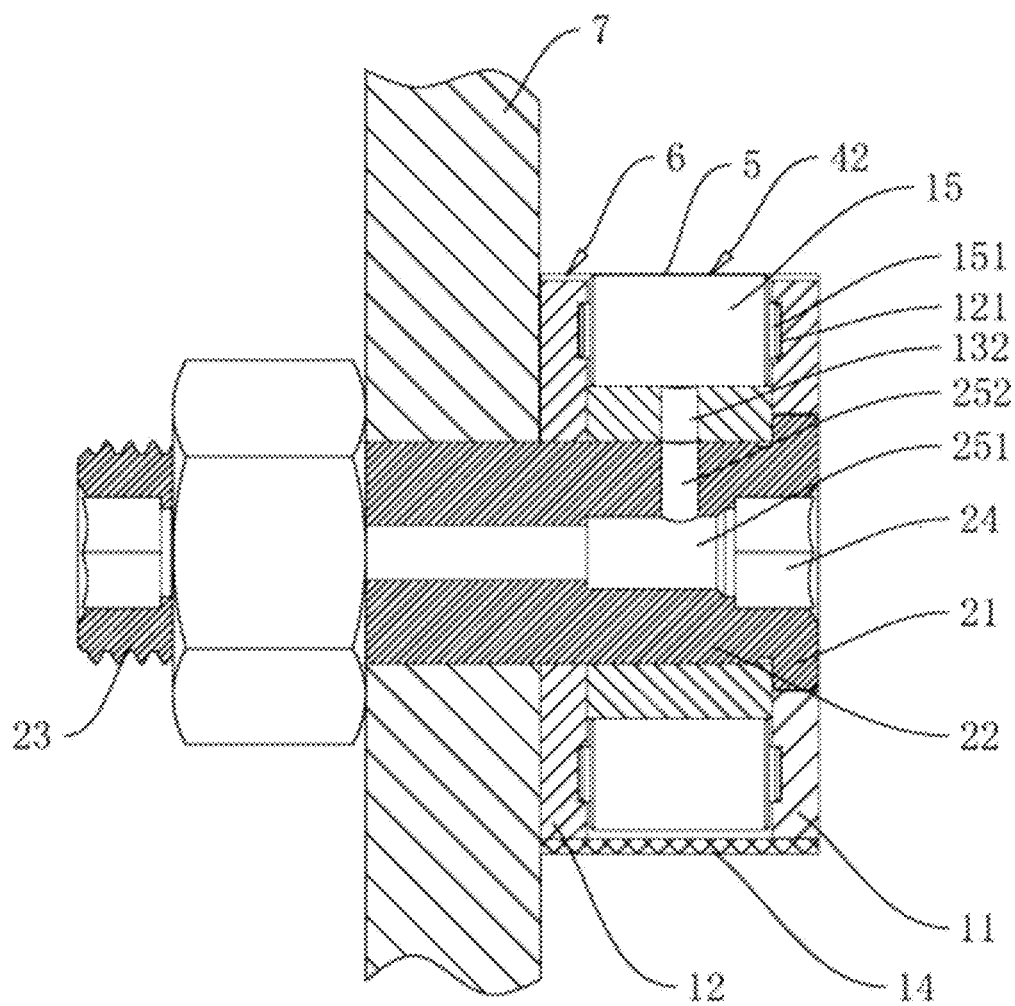
FIG. 8 is a section diagram mainly for indicating a whole supporting structure for a retractable fork in the embodiments of the present application.
Figure 9:
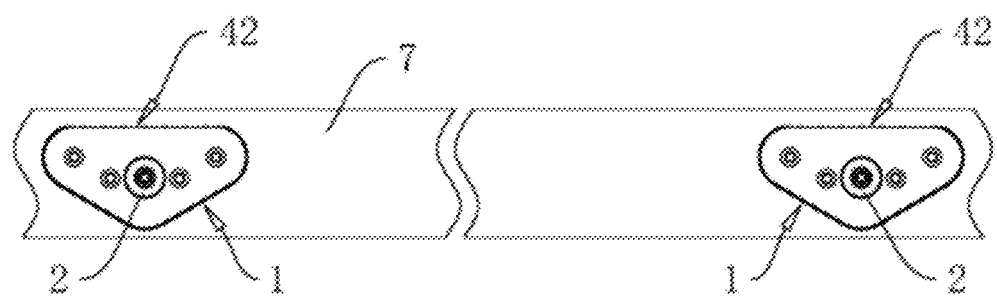
FIG. 9 is a schematic diagram mainly for indicating assembly of the whole supporting structure for a retractable fork in the embodiments of the present application.

Referring to FIG. 8 and FIG. 9, the supporting structure for retractable fork includes the main frame body 7 in the above embodiments and two recirculating roller bearings disclosed in Embodiment 2. The two recirculating roller bearings are arranged on the main frame body 7 at interval in a direction parallel to the retraction direction of the retractable fork.

Referring to FIG. 8 and FIG. 9, in the actual installation process, after the bearing body 1 is assembled, the connection bolt is introduced through the bearing body 1 and then the main frame body 7. The bearing body 1 is fixed on the main frame body 7 by engagement of the threaded portion of the connection bolt with a fastening nut. However, before screwing the fastening nut, the operator can drive the bearing body 1 to rotate, so as to adjust the fit between the opened load-bearing portion 42 of the bearing body 1 and the contact surface of the retractable fork. Or one bearing body 1 can be prefixed firstly. When the other bearing body 1 is being fixed by another connection bolt, the fit between two bearing bodies 1 relative to the contact surface of the retractable fork can be adjusted by rotation while the bearing bodies 1 support the retractable fork, since two points determine a line.

Figure 10:
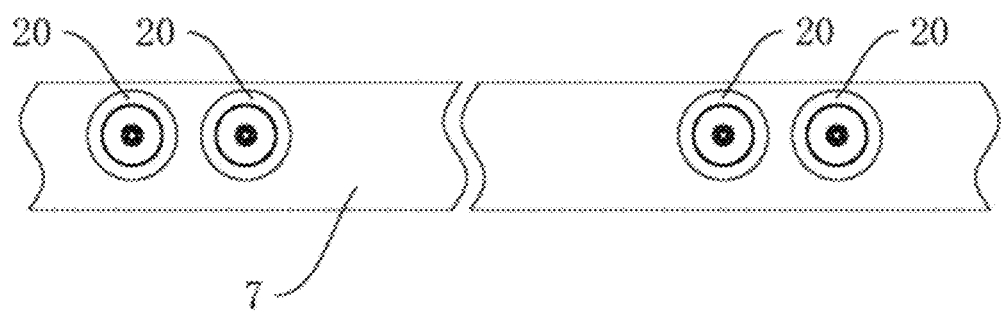
FIG. 10 is a schematic diagram mainly for indicating a supporting structure formed by a roller bearing in the related technology.
Figure 11:
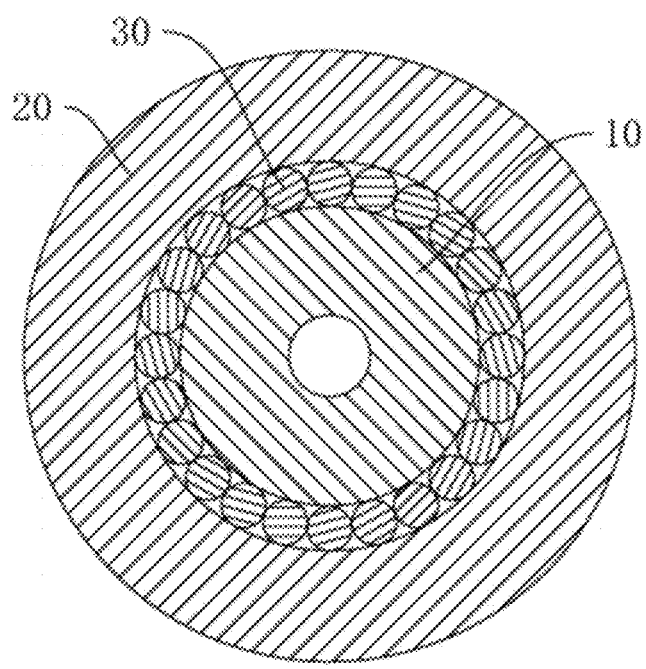
FIG. 11 is a section diagram of a load-bearing structure in the related technology.
Figure 12:
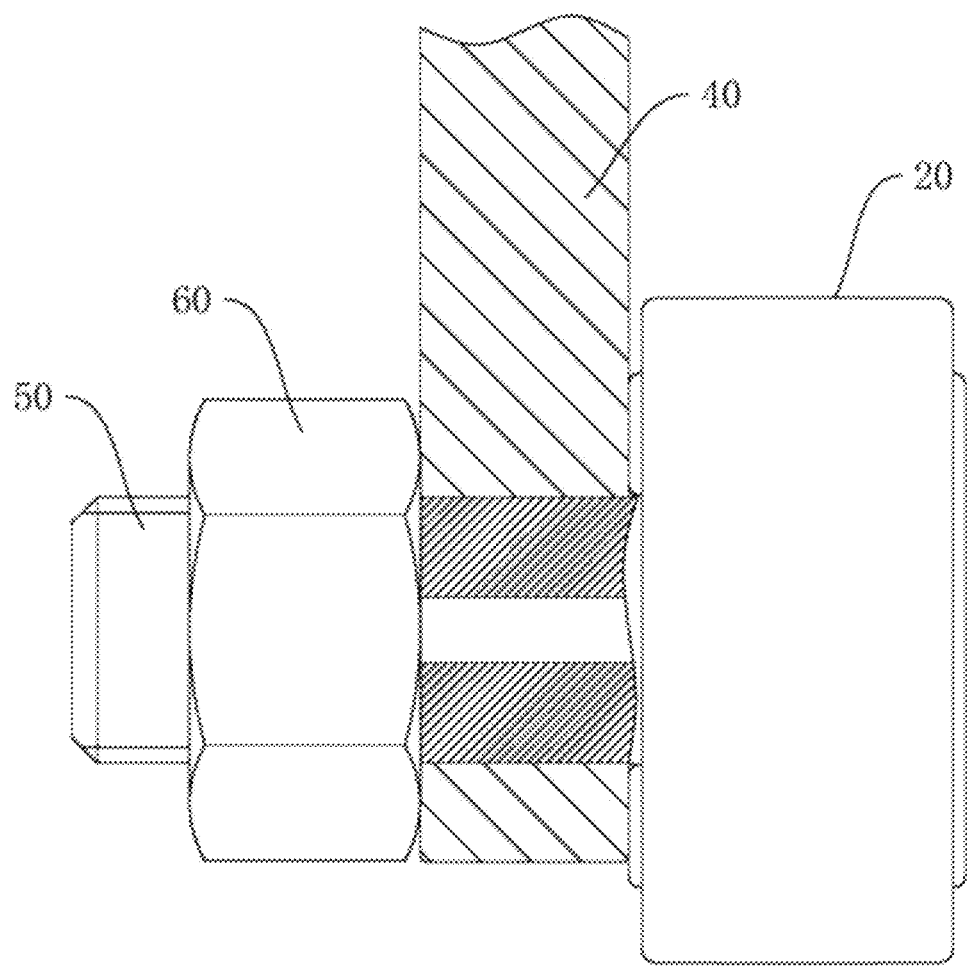
FIG. 12 is an installation schematic diagram between a main frame body and a load-bearing structure in the related technology.

Referring to FIG. 10, the roller bearing in the related technology is mounted on the main frame body 7 to form a supporting structure. The roller bearing in the related technology is arranged with a single axis, but the installation number of the roller bearings is required to be increased to realize a higher bearing capacity of the supporting structure. In actual use, compared with the embodiment of the present application, this supporting structure requires at least three roller bearings under the same load. Once the installation number of the roller bearings is larger than two, the operator must spend more time on adjustment of the position of the third roller bearing relative to the other two roller bearings during installation, such that each roller bearing can bear load, which increases the installation and adjustment time of the whole structure.

No additional components for adjusting the straightness between two bearing bodies 1 are not required when using the technical solution of the present application, thereby reducing cost and facilitating the whole installation and adjustment, so as to realize a uniform force of the bearing and to increase the service life.

The above are the preferred embodiments of the present application, which are not intended to limit the protection scope of the present application. Therefore, all equivalent changes made according to the structure, shape and principle of the present application should be covered within the protection scope of the present application.

LISTING OF REFERENCE SIGNS 1 bearing body;
11 front cover plate;
111 first through hole;
12 rear cover plate;
121 circulating guiding groove;
13 inner supporter;
131 second through hole;
132 communicating groove;
133 lubricating groove;
134 mounting base;
135 self-lubricating body;
14 sealing covering;
141 load-bearing groove;
15 rolling carrier;
151 guiding protrusion;
2 connector;
21 limiting protrusion;
22 rod portion;
23 connection portion;
24 polygon countersunk groove;
25 oil through groove;
251 first oil groove;
252 second oil groove;
3 accommodation space;
4 circulating guiding path;
41 sealing portion;
42 opened load-bearing portion
5 load-bearing point;
6 protruded portion;
7 main frame body;
8 retractable fork;
70 retractable fork.

What is claimed is:

1. A recirculating roller bearing, comprising a front cover plate, a rear cover plate, an inner supporter, a sealing covering, a plurality of rolling carriers and at least one connector, wherein:

the front cover plate and the rear cover plate are detachably connected to two opposite sides of the inner supporter respectively, the sealing covering is arranged around the inner supporter along peripheries of the front cover plate and the rear cover plate, and two lateral edges of the sealing covering are arranged between the peripheries of the front cover plate and the rear cover plate in a sealing manner;

a circulating guiding path is formed between the front cover plate, the rear cover plate, the inner supporter and the sealing covering, and the circulating guiding path comprises a sealing portion and an opened load-bearing portion;

the plurality of rolling carriers are all filled in the circulating guiding path, each of the plurality of rolling carriers is in rolling fit with the inner supporter, and each of the plurality of rolling carriers is in rolling fit with a retractable fork when passing the opened load-bearing portion of the circulating guiding path; and the at least one connector is configured to detachably fix the inner supporter, the front cover plate and the rear cover plate on a main frame body, a load-bearing point is defined at a contact position between a radially outmost portion of the plurality of rolling carriers at the opened load-bearing portion and the retractable fork, two ends of the sealing covering at the opened load-bearing portion are provided with a protruded portion protruding relative to the load-bearing point respectively, and the protruded portion is elastic and is configured to abut against a contact surface of the retractable fork in a sealing manner.

2. The recirculating roller bearing according to claim 1, wherein a side of the inner supporter facing the opened load-bearing portion is longer than a side of the inner supporter away from the opened load-bearing portion.

3. The recirculating roller bearing according to claim 1, wherein the at least one connector successively extends through the front cover plate, the inner supporter and the rear cover plate, an extension end of the at least one connector is provided with a connection portion detachably connected to the main frame body.

4. The recirculating roller bearing according to claim 3, wherein the front cover plate is provided with a first through hole, the inner supporter and the rear cover plate are provided with a second through hole respectively, wherein a diameter of the first through hole is larger than a diameter of the second through hole, an end of the at least one connector away from the extension end is provided with a limiting protrusion, and the limiting protrusion is configured to be embedded in the first through hole and abut against a side of the inner supporter facing the front cover plate.

5. The recirculating roller bearing according to claim 4, wherein the at least one connector further comprises a rod portion, the rod portion is positioned between the limiting protrusion and the connection portion, and the rod portion passes through the second through hole.

6. The recirculating roller bearing according to claim 5, wherein the connection portion is configured as a fixing thread, which is configured to be engaged with a fastening nut, and two ends of the at least one connector along an extending direction of the at least one connector are provided with a polygon countersunk groove respectively.

7. The recirculating roller bearing according to claim 6, wherein the at least one connector is provided with an oil through groove communicating with the polygon countersunk groove, and the inner supporter is provided with a communicating groove communicating with the circulating guiding path and the oil through groove.

8. The recirculating roller bearing according to claim 1, wherein the sealing covering has an annular structure, which is provided with a load-bearing groove in an area corresponding to the opened load-bearing portion, and the load-bearing groove penetrates the sealing covering only in a load-bearing direction.

9. The recirculating roller bearing according to claim 1, wherein the plurality of rolling carriers are configured as cylinder rollers, two ends of each of the cylinder rollers are provided with a guiding protrusion respectively, opposite sides of the front cover plate and the rear cover plate facing to each other are provide with a circulating guiding groove in a same circulating direction as the circulating guiding path respectively, a circumferential surface of each of the cylinder rollers is in rolling fit with the inner supporter, and the guiding protrusion is configured to be embedded in the circulating guiding groove.

10. The recirculating roller bearing according to claim 1, wherein an outer sidewall of the inner supporter is provided with a lubricating groove, the lubricating groove is disposed in an area corresponding to the sealing portion, and a self-lubricating body is placed in the lubricating groove.

11. The recirculating roller bearing according to claim 1, wherein the self-lubricating body is formed from a resin with a lubricating oil, wherein the lubricating oil is retained in gaps between resin particles.

12. The recirculating roller bearing according to claim 1, wherein the at least one connector is at least two connectors, which are arranged at intervals along a retraction direction of the retractable fork.

13. The recirculating roller bearing according to claim 1, wherein the at least one connector is one connector, which is shaped as a cylinder.

14. The recirculating roller bearing according to claim 1, wherein a segment of the circulating guiding path at the opened load-bearing portion extends linearly, and the opened load-bearing portion extending linearly is parallel to a retraction direction of the retractable fork.

15. The recirculating roller bearing according to claim 1, wherein the inner supporter has a cross-section with a shape of a triangle or a trapezoid.

16. The recirculating roller bearing according to claim 1, wherein there are two opened load-bearing portions, and the two opened load-bearing portions are configured as linear.

17. A recirculating roller bearing, comprising a front cover plate, a rear cover plate, an inner supporter, a sealing covering, a plurality of rolling carriers and at least one connector, wherein:

the front cover plate and the rear cover plate are detachably connected to two opposite sides of the inner supporter respectively, the sealing covering is arranged around the inner supporter along peripheries of the front cover plate and the rear cover plate, and two lateral edges of the sealing covering are arranged between the peripheries of the front cover plate and the rear cover plate in a sealing manner;

a circulating guiding path is formed between the front cover plate, the rear cover plate, the inner supporter and the sealing covering, and the circulating guiding path comprises a sealing portion and an opened load-bearing portion;

the plurality of rolling carriers are all filled in the circulating guiding path, each of the plurality of rolling carriers is in rolling fit with the inner supporter, and each of the plurality of rolling carriers is in rolling fit with a retractable fork when passing the opened load-bearing portion of the circulating guiding path;

the at least one connector is configured to detachably fix the inner supporter, the front cover plate and the rear cover plate on a main frame body;

the at least one connector successively extends through the front cover plate, the inner supporter and the rear cover plate, an extension end of the at least one connector is provided with a connection portion detachably connected to the main frame body; and the front cover plate is provided with a first through hole, the inner supporter and the rear cover plate are provided with a second through hole respectively, wherein a diameter of the first through hole is larger than a diameter of the second through hole, an end of the at least one connector away from the extension end is provided with a limiting protrusion, and the limiting protrusion is configured to be embedded in the first through hole and abut against a side of the inner supporter facing the front cover plate.

18. A recirculating roller bearing, comprising a front cover plate, a rear cover plate, an inner supporter, a sealing covering, a plurality of rolling carriers and at least one connector, wherein:

the front cover plate and the rear cover plate are detachably connected to two opposite sides of the inner supporter respectively, the sealing covering is arranged around the inner supporter along peripheries of the front cover plate and the rear cover plate, and two lateral edges of the sealing covering are arranged between the peripheries of the front cover plate and the rear cover plate in a sealing manner;

a circulating guiding path is formed between the front cover plate, the rear cover plate, the inner supporter and the sealing covering, and the circulating guiding path comprises a sealing portion and an opened load-bearing portion;

the plurality of rolling carriers are all filled in the circulating guiding path, each of the plurality of rolling carriers is in rolling fit with the inner supporter, and each of the plurality of rolling carriers is in rolling fit with a retractable fork when passing the opened load-bearing portion of the circulating guiding path;

the at least one connector is configured to detachably fix the inner supporter, the front cover plate and the rear cover plate on a main frame body; and the sealing covering has an annular structure, which is provided with a load-bearing groove in an area corresponding to the opened load-bearing portion, and the load-bearing groove penetrates the sealing covering only in a load-bearing direction.

* * * * *